United States Patent Office 3,465,579
Patented Sept. 9, 1969

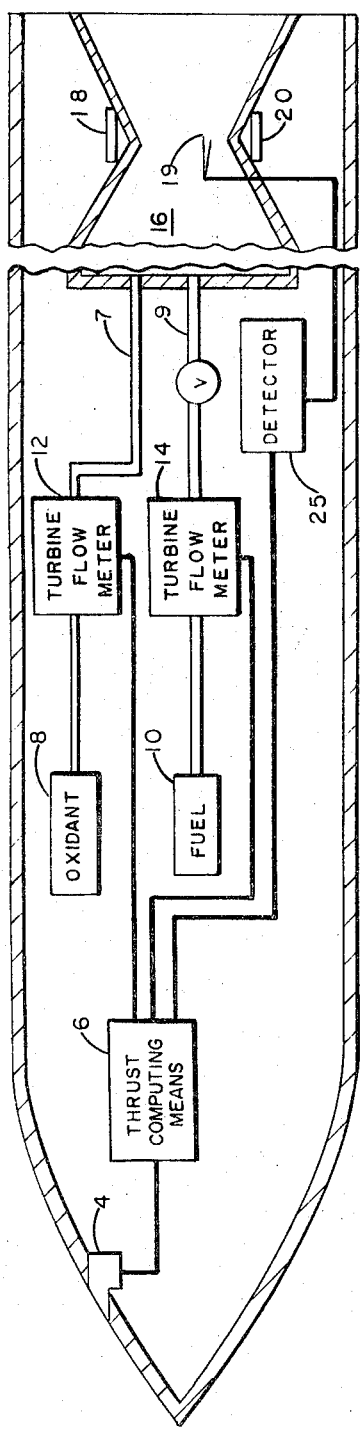
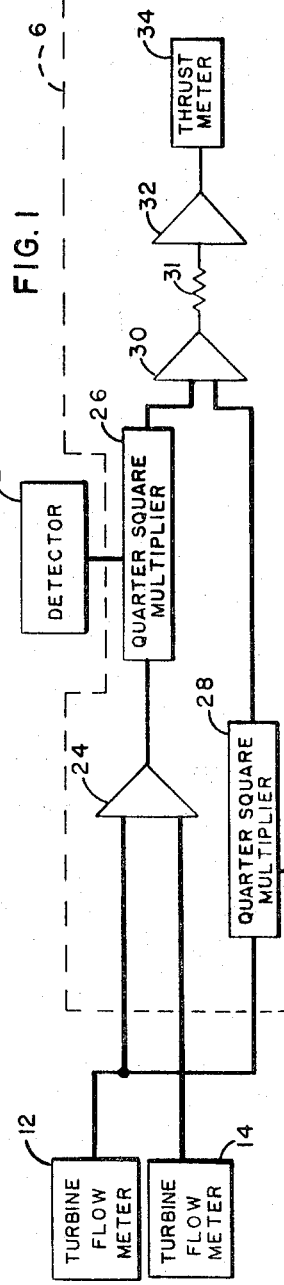
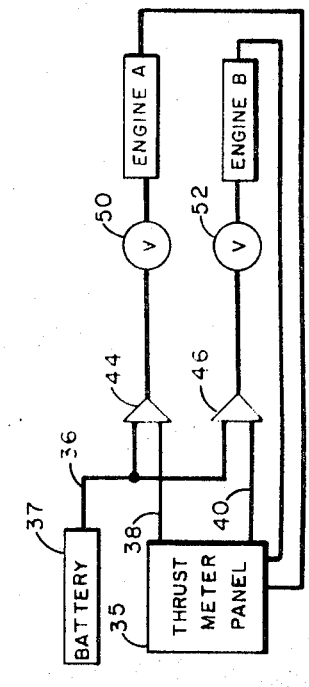
FIG. 1
FIG. 2
FIG. 3
Charles M. Cason,
INVENTOR

3,465,579
SYSTEM FOR INSTANTANEOUSLY MEASURING
JET THRUST
Charles M. Cason, 7114 Criner Road SE.,
Huntsville, Ala. 35802
Filed June 25, 1968, Ser. No. 739,724
Int. Cl. G01m 15/00
U.S. Cl. 73—117.4        4 Claims

ABSTRACT OF THE DISCLOSURE

A jet thrust measuring system having a gas velocity probe positioned in the exhaust nozzle area for measuring the velocity of exhaust gases from a jet engine and utilizing this measurement along with other parameters, i.e., vehicle velocity, oxidant mass flow, fuel mass flow and acceleration of gravity, to solve a thrust yielding equation through the use of circuitry.

Dedicatory clause

The invention described herein may be manufactured, used, and licensed by or for the Government for governmental purposes without the payment of any royalty thereon.

Background of the invention

In the rocket and jet engine art, the need exists for a means to instantaneously measure thrust while the vehicle is in flight in order more effectively to control the overall performance of the vehicle. The in-flight measured thrust, for example, can be used to control mixture ratios for maximum performance and thrust efficiency. Previous means to measure thrust have made use of accelerometers and integrators, requiring a knowledge of the history of thrust to acquire instantaneous thrust. The present novel system measures thrust instantaneously without such requirements.

Summary of the invention

The present invention, through the use of circuitry, provides an electrical signal proportional to the in-flight thrust of a rocket or jet engine. This signal can be read on a calibrated thrust meter and used simultaneously as a controlling signal in operations related to thrust efficiency.

Brief description of the drawings

FIGURE 1 is an axial cross-sectional view of a missile having therein the thrust measuring system according to the present invention;

FIGURE 2 is a block diagram illustrating circuitry of the present thrust measuring system and;

FIGURE 3 is a schematic of a thrust synchronization system utilizing the thrust measuring system according to this invention.

Description of the preferred embodiment

The present invention measures the in-flight thrust of a rocket or jet engine through the implementation of the formula $F=1/g[(Wa+Wf)V_1-WaVo]$ wherein F is resultant thrust. $Vo$ is air speed of the vehicle, $Wa$ is oxidant mass flow to the engine, $Wf$ is fuel mass flow to the engine, $g$ is acceleration of gravity and $V_1$ is speed of combusted oxidant and fuel at the exhaust.

Referring to FIGURE 1, the thrust measuring system of this invention contains four sensing devices that have their outputs connected as four inputs to thrust computing means 6. These sensing devices include two flowmeters 12 and 14 which are of the type commercially available for providing a voltage signal proportional to mass flow. Flowmeter 12 is used to measure oxidant mass flow ($Wa$) and is positioned conveniently within fluid line 7 interconnecting oxidant tank 8 with combustion chamber 16. In a jet engine, however, the air mass flow to the jet engine inlet of the vehicle can be substituted for $Wa$. Flowmeter 14 measures fuel mass flow ($Wf$) and is positioned within fluid line 9 interconnecting fuel tank 10 to combustion chamber 16. To measure vehicle velocity, a third sensing device, pitot tube 4, is used. Pitot tube 4 is positioned so that it is exposed to the moving air surrounding the engine and oriented so that its open end faces the onrushing air. Pitot tube 4 has conventional built in means for converting the fluid signal from the moving air to a proportional electrical output signal. Exhaust velocity is measured by a fourth sensing device. The fourth sensing device is similar to the probe as shown in Cason's Patent No. 3,343,414, issued Sept. 26, 1967. The fourth exhaust velocity sensing device includes field coils 18 and 20 positioned so that when energized by a power supply (not shown) a magnetic field is produced that is transverse to the exhaust gas flow, electrodes 19 positioned in and oriented parallel to the exhaust gas flow so that a line drawn between the electrodes 19 will be perpendicular to the flux lines of the magnetic field produced by the coils 18 and 20, and a synchronous detector 25. Synchronous detector 25 has its gain adjusted to give an output voltage proportional to exhaust gas velocity. The exhaust velocity sensing device operates on the principle that a polarization electric field equal to the exhaust velocity multiplied by the applied magnetic field is generated in the exhaust flow to allow it to pass through the magnetic field. Therefore, measurement of the induced polarization electric field provides an indication of exhaust velocity.

In FIGURE 2, the circuitry of thrust computing means 6 is shown to include a summing amplifier 24 used to receive the electrical signals from flowmeters 12 and 14. Amplifier 24 outputs a signal—$(Wa+Wf)$. Inverted quarter square multiplier 28 receives the electrical signals from flowmeter 12 and the output of pitot tube 4. Multiplier 28 outputs a signal—$(WaVo)$. Inverted quarter square multiplier 26 receives the signal from summing amplifier 24 and detector 25. Multiplier 26 outputs a signal, $(Wa+Wf)V_1$. A second summing amplifier 30 receives the output signals of inverting quarter square multipliers 26 and 28. Summing amplifier 30 is further connected in series with a dropping resistor 31 to give the $1/g$ factor; and in series with resistor 31 is an inverter 32 to give the +F signal, $1/g[(Wa+Wf)V_1-WaVo]$. This signal can be read on meter 34, which is calibrated in thrust.

An application of the thrust measuring system of this invention is in the thrust synchronization of a vehicle having multiple engines. Each engine's thrust is measured by using the present novel thrust measuring system, individually, for each engine. As shown in FIGURE 3, thrust signals are fed to a central thrust meter panel 35 where each engine's thrust can be read on its respective thrust meter. A voltage source, battery 37, provides a voltage signal proportional to a predetermined thust to be used as a synchronizing signal. Specifically, FIGURE 4 represents a two-engine arrangement. The two engines are engine A and engine B.

To obtain the difference, if any, between the thrust signal of engine A and the synchronizing signal from battery 37, the two signals are transmitted by lines 38 and 36 respectively, to differential amplifier 44. Further, to adjust engine A for any difference between its thrust and the predetermined thrust represented by the signal from battery 37, the "error" signal from differential amplifier 44 is fed to a servo valve or valves 50 located in the fuel line or lines of engine A. This increases or decreases thrust in engine A by increasing or decreasing the amount of fuel fed to the engine.

Simultaneously, while the operation for the synchronization of engine A is being carried out, engine B is also being synchronized in the manner explained immediately following. The signal proportional to the thrust of engine B and the predetermined thrust signal from battery 37 are compared by transmitting both signals to differential amplifier 46. The thrust of engine B is then adjusted by having the "error" signal from amplifier 46 fed to a servo valve or valves 52 located in the fuel line or lines of engine B.

While FIGURE 3 specifically, for the purpose of illustration, represents a two-engine arrangement, the present novel system is not limited to the synchronization of two engines. It is also noted that the signals from the sensing devices of the different engines could be multiplexed to a common analog circuit which would compute thrust. Multiplexing of the signals from the different engines would require sample and hold amplifiers to receive the computed thrust signals and feed control signals to the respective servo valves.

What is claimed is:

1. A thrust measuring system for measuring the in-flight thrust of an engine, said system comprising: first means for providing an electrical signal proportional to the mass flow rate of oxidant fed to the engine; second means for providing an electrical signal proportional to the mass flow rate of fuel fed to the engine; an exhaust velocity sensing device for providing an electrical signal proportional to the velocity of exhaust gases; a vehicle velocity measuring device for providing an electrical signal proportional to air speed of the engine; and thrust computing means having input terminals connected to receive said signals from said first and second means and to receive output signals from said exhaust velocity sensing device and said vehicle velocity measuring device to thereby compute the thrust of the engine.

2. A thrust measuring system as set forth in claim 1 wherein said thrust computing means includes; first summing means having input terminals connected to receive said signals from said first and second means, a first multiplier connected to said summing means and said exhaust velocity sensing device to receive output signals from said first summing means and said exhaust velocity sensing device, a second multiplier connected to said first means and said velocity measuring device to receive output signals from said first means and said velocity measuring device, second summing means having inputs connected to outputs of said first and second multipliers for receiving output signals from said first and second multipliers, and a dropping resistor connected in series with an output of said second summing means and a meter calibrated in thrust.

3. A thrust measuring system as set forth in claim 2 wherein said first and second multipliers are inverted multipliers and further comprising an inverter connected between said resistor and said thrust meter.

4. A thrust measuring system as set forth in claim 3 wherein said exhaust velocity sensing device comprises: a coil displaced so that when energized by a power supply, it provides a magnetic field transverse to exhaust gas flow; a pair of electrodes positioned in and oriented parallel to said gas flow so that a line drawn between said electrodes will be perpendicular to the flux lines of said magnetic field; and a detector having its input connected to said electrodes.

References Cited
UNITED STATES PATENTS

| | | | |
|---|---|---|---|
| 3,019,604 | 2/1962 | Hall | 73—117.4 |
| 3,205,704 | 9/1965 | Taylor | 73—117.4 |
| 3,373,564 | 3/1968 | Maybin. | |

RICHARD C. QUEISSER, Primary Examiner

JERRY W. MYRACLE, Assistant Examiner

U.S. Cl. X.R.

235—150.2